Nov. 14, 1933.   C. F. HIGGINS   1,935,151
DUMPING LAND VEHICLE
Filed Jan. 25, 1929   4 Sheets-Sheet 1

Inventor:
Clark F. Higgins,
by Emery, Booth, Lamey & Varney.
Attys.

Nov. 14, 1933.　　　　C. F. HIGGINS　　　1,935,151
DUMPING LAND VEHICLE
Filed Jan. 25, 1929　　　4 Sheets-Sheet 3

Fig. 4.

Inventor:
Clark F. Higgins,
by Emery, Booth, Janney & Varney
Att'ys

Nov. 14, 1933.　　　　C. F. HIGGINS　　　　1,935,151
DUMPING LAND VEHICLE
Filed Jan. 25, 1929　　　　4 Sheets-Sheet 4

Inventor:
Clark F. Higgins,
by Emery, Booth, Janney & Varney,
Attys.

Patented Nov. 14, 1933

1,935,151

UNITED STATES PATENT OFFICE 1,935,151

DUMPING LAND VEHICLE

Clark F. Higgins, Melrose Highlands, Mass., assignor, by mesne assignments, to General Body & Hoist Company, Everett, Mass., a corporation of Massachusetts Application January 25, 1929. Serial No. 335,065

43 Claims. (Cl. 298—11)

This invention relates to dumping land-vehicles of the elevating and tilting class, and will be best understood by reference to the following description, when taken in connection with the accompanying drawings of one specific embodiment thereof, while its scope will be more particularly pointed out in the appended claims.

In the drawings:—

Fig. 3 is a side elevation, showing in full lines the mechanism as it appears when the load-receptacle is fully elevated and tilted, and in dotted lines in a partially elevated position, but with approximately the same degree of inclination;

Referring to the drawings, and to the embodiment of the invention which is illustrated therein, there is shown (see Fig. 1) a land-vehicle such as a motor truck, having a chassis frame 10, rear wheels 11, a driver's cab 12, and a load-receptacle or body 13, all of which may be of common form. Supported by the chassis frame, there is an appropriate main frame, herein comprising transverse bars 14, 15 and 16, two longitudinal bars 17, and two longitudinal bars 18. The longitudinal bars 17 rest upon the transverse bars 14 and 15, and upon the front ends of the longitudinal bars 18. The main frame is secured to the chassis frame, as by U-bolts 19 and 20.

Figure 1:
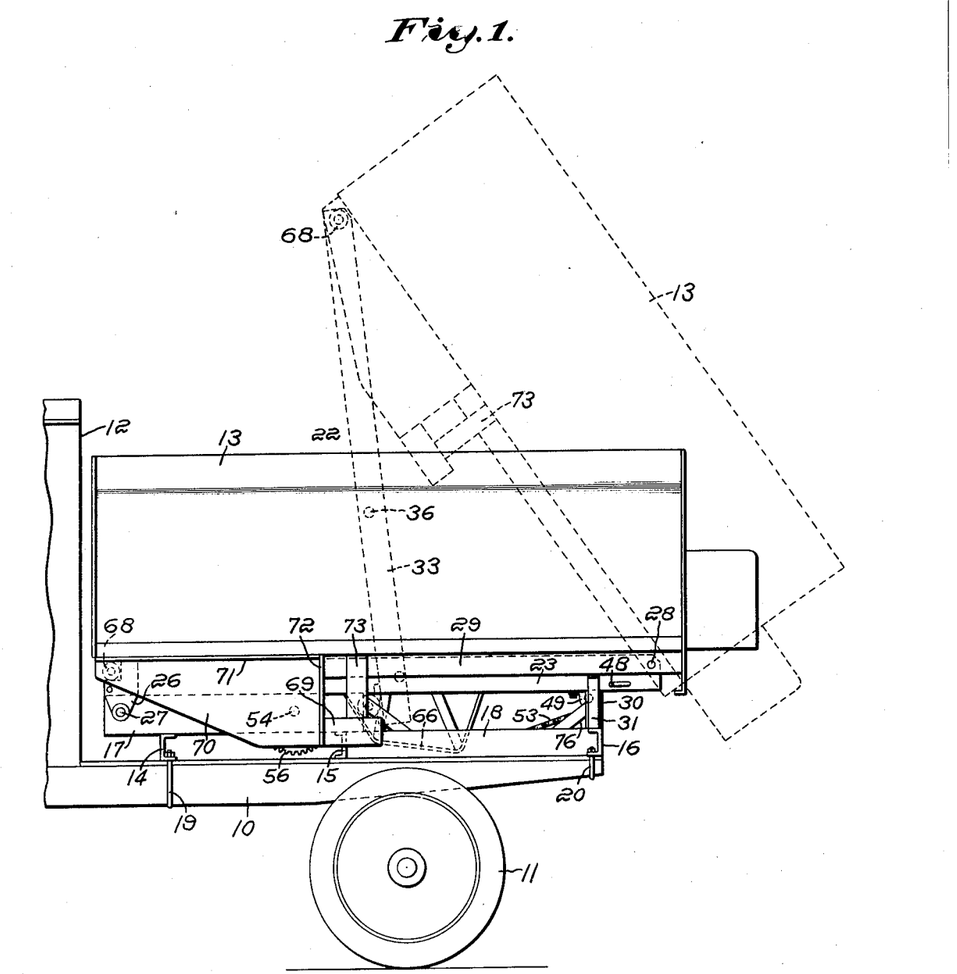
Fig. 1 is a side elevation of a land-vehicle equipped with a load-receptacle, elevating and tilting mechanism exemplifying the invention. The parts are shown in full lines in their normal position, and they are shown in dotted lines in the positions which they occupy when the load-receptacle is simply tilted, without being elevated bodily.
Figure 4:
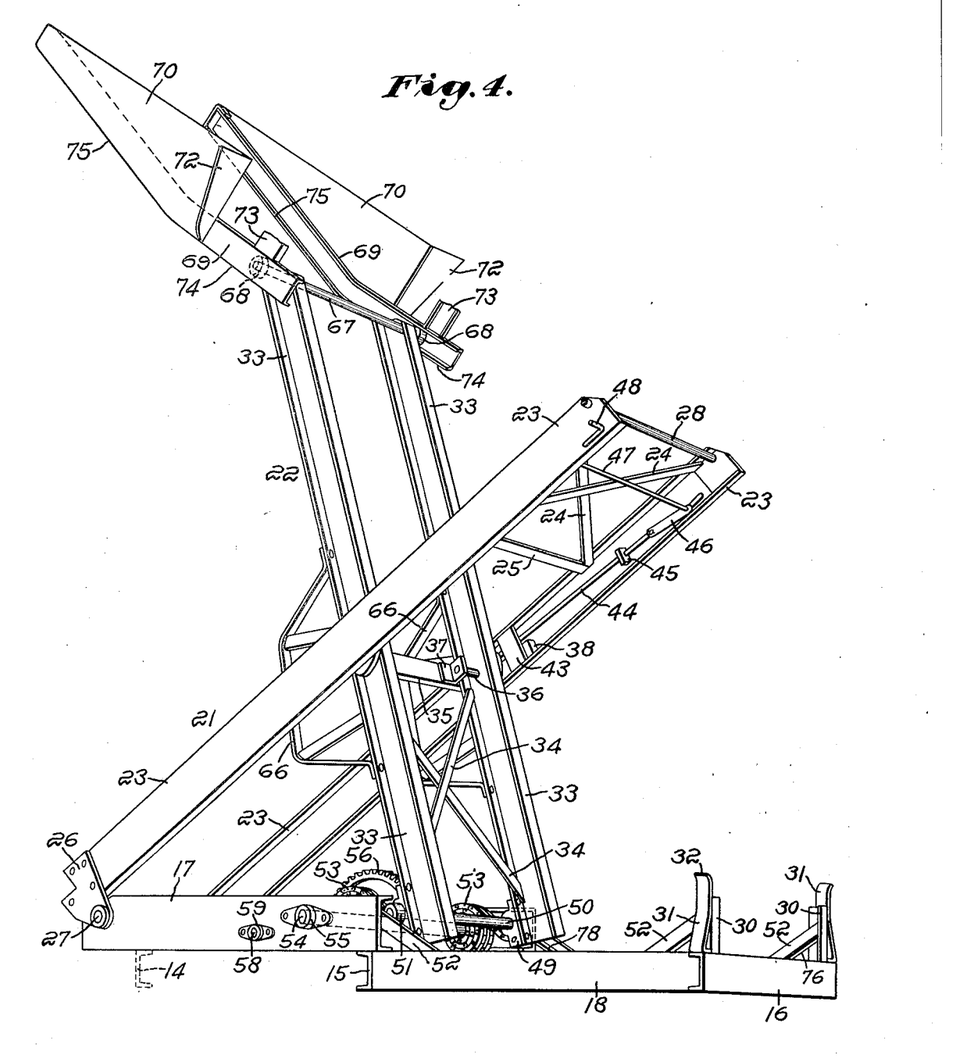
Fig. 4 is a perspective view of the mechanism minus the load-receptacle, with the parts in the position in which they are shown in full lines in Fig. 3.

Referring to Fig. 4, the load-receptacle is connected to the main frame by two levers in the form of frames, designated generally by the numerals 21 and 22. The frame 21 comprises two members, herein channel bars 23, rigidly tied together by suitable means, herein lattice work comprising diagonal members 24 and a cross-bar 25, which is at right angles to the channel bars 23. The bars 23 are in the same vertical plane as the bars 17, and are pivoted to the latter as by being provided with hinge pieces 26, which receive a pivot, such as a shaft 27, which extends through the hinge pieces and through the bars 17. The other ends of the bars 23 are pivoted to the load-receptacle, as by a shaft 28, which extends through said bars and through bars 29 (see Fig. 3) on the under side of the load-receptacle. In the normal position of the load-receptacle, the latter is horizontal, as shown in Fig. 1. The bars 23 are likewise horizontal, and for a considerable distance rest upon the bars 17. In this position, the bars 23 are further supported on the main frame by upright posts 30, best shown in Fig. 4, at the rear corners of the main frame. Referring again to Fig. 4, lateral displacement of the bars is prevented by brackets 31, whose upper ends diverge slightly at 32 to guide the bars 23 into place, as the frame 21 is lowered.

The frame 22 is somewhat similar, in a general way, to the frame 21, though narrower, and comprises side members, herein I-beams 33, rigidly connected with each other, as by lattice braces 34, and by a brace 35 which is at right angles to the bars 33. The arrangement of the braces of the frames 21 and 22 is such that when the load-receptacle is lowered, as shown in Fig. 6, there is a space between the braces of one frame and the braces of the other, to receive the chute (not shown).

Figure 2:
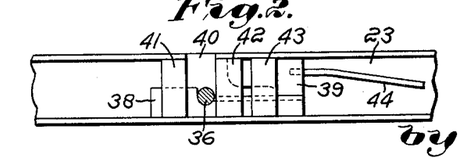
Fig. 2 is an elevation, partly in section, illustrating a part of the locking device, which may be operated at will to enable the body to be tilted without being elevated, or to be elevated bodily and tilted.

Normally, the frame 21 is pivotally connected to the frame 22 by a pivotal connection, herein two separate, axially aligned pivots 36, which might be made as a continuous shaft from side to side, were it not for the fact that if it were so constructed, it would prevent a coal-chute from being introduced between the bars 33. Therefore, in the present example, the pivots 36 are in the nature of stub shafts, each of which is rigidly secured at one end to a bracket 37, which in turn is rigidly secured to the cross-bar 35. Each of these pivots extends through the web of the adjacent bar 33, and is normally received in a two-part bearing (see Fig. 2) carried by the bar 23, said bearing comprising a fixed piece 38 and a slidable piece 39, which, as shown in Fig. 2, can be moved rearwardly to uncover the pivot and to allow the latter to be withdrawn upwardly through an opening 40 cut in the upper flange of the channel bar 23. The bearing blocks 38 and 39 are conveniently held in place in the channel of the bar 23 by plates 41, 42 and 43, uniting the top and bottom flanges of the channel bars 23. Movement of the bearing blocks 39 is conveniently accomplished by bars 44, each of which is secured at one end to its block, and extends thence rearwardly (now see Fig. 4) through a guide 45, and has its rear end connected by a link 46 to a crank 47, which extends through the bars 23 and is provided with a crank-handle 48. By turning the crank-handle 48 from its position shown in Figs. 3, 4 and 5, to the position shown in Fig. 1, the upper bearing blocks 39 are moved from the position shown in Fig. 6 to the position shown in Fig. 2. When, therefore, under these circumstances, power is applied to the frame 22, in a forward direction by means presently to be described, the pivots 36 will rise from the lower bearing blocks 38, and will pass through the cut-out openings 40, and the frame and the load-receptacle assume the dotted line position shown in Fig. 1. During this movement, the load-receptacle simply rocks about the axis of the pivot 28 on the frame 21, which at this time remains in its normal horizontal position. In this way, the load-receptacle is tilted, without being elevated bodily.

Figure 5:
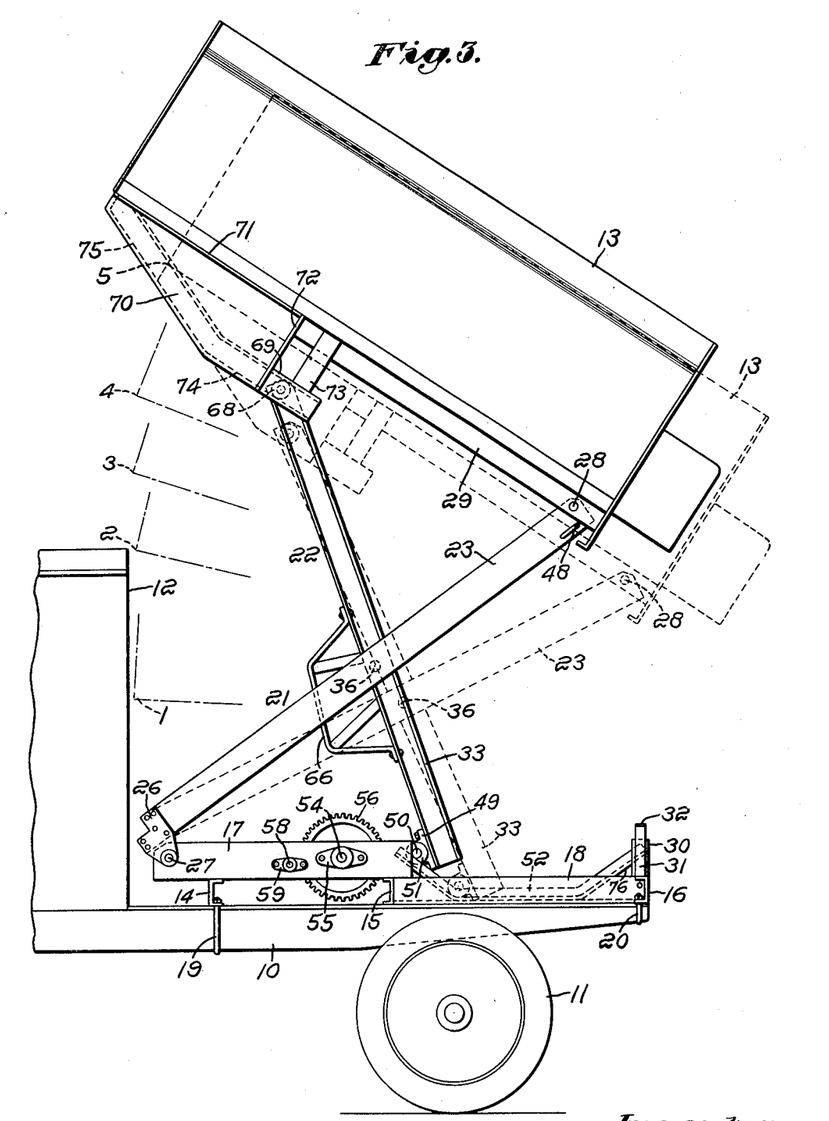
Fig. 5 is a plan of the mechanism minus the load-receptacle.

The mechanism for applying power to the frame 22, and for guiding the same relatively to the main frame and to the load-receptacle, will now be described, reference being had at first to Figs. 5 and 6. Brackets 49, secured to the bars 33, afford bearings for a shaft 50, whose outer ends carry rollers 51 which rest upon and are guided by appropriate guides, herein angle bars 52, secured to the main frame. Flexible operating members, shown as wide, flat chains 53, are secured at their rear ends to the brackets 49, and extend thence in a forward direction to a winding shaft 54, to which the front ends of the chains are secured, and about which the chains are wound. Initially, there is a partial turn of each chain about the winding shaft, as shown in Fig. 6. This shaft is mounted in appropriate bearings 55 (see Fig. 5), secured to the bars 17 of the main frame. The shaft is driven by appropriate mechanism, herein a spur gear 56, secured to the shaft and meshing with a pinion 57, which is secured to a shaft 58. The latter is mounted at one end in a bearing 59, secured to one of the bars 17, while the other end is connected by a coupling 60 to a shaft 61 extending from the side of a transmission mechanism housing 62, the latter being supported on longitudinal bars 63, which in turn are secured to the transverse bars 14 and 15, which support the longitudinal bars 17. It is deemed unnecessary to show in the drawings the mechanism housed within the casing 62, as a disclosure of the same is not essential to a proper understanding of my present invention, but it should be understood that this driving mechanism receives power from the usual power take-off of the motor truck, and has reduction gearing to impart to the shaft 61 a slow and powerful turning movement. It is usual to employ as part of the mechanism a worm and worm gear, to lock the shaft 61 in any position in which it is stopped.

Figure 6:
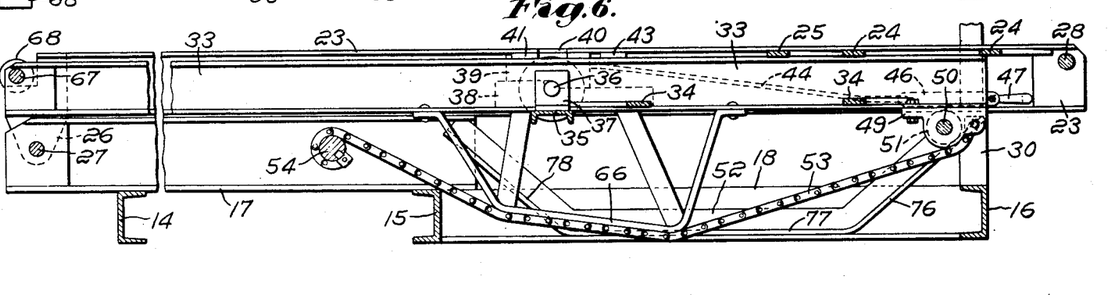
Fig. 6 is a sectional view on line 6—6 of Fig. 5.

It should here be pointed out that when the shaft 54 is rotated contraclockwise, as viewed in Fig. 6, the chain 53 will be wound spirally (not helically) upon itself. This is an important factor in the operation of the mechanism, because the drive has a greater mechanical advantage, or leverage, at the start of the hoisting operation, where great power is needed; but as the movement progresses, the mechanical advantage of the wrapping chain diminishes, and the linear speed of the chain correspondingly increases. As the chains are wound onto the shaft, they exert a forward pull on the rear end of the frame 22, to which they are attached. The initial lifting motion of the frame is conveniently accomplished by providing the latter with appropriately-shaped shoes or cams 66, which, in the normal position of the chains shown in Fig. 6, deflect the latter downwardly between their points of attachment to the frame on the one hand, and to the winding shaft on the other. As a result, the winding of the chains on the shaft is accompanied by a direct, upward lift, exerted by the chains through the shoes or cams.

Before describing the shape or profile of the guide 52 and its effect on the angle of the load-receptacle during the hoisting operation, I will describe the connection of the front end of the frame 22 with the load-receptacle, reference being had to Fig. 4. A shaft 67, extending through the webs of the channel bars 33, carries at its outer ends rollers 68, which travel in guides or rails 69, rigidly secured to the load-receptacle, as by plates 70, having horizontal flanges 71 (see Fig. 3), secured to the under side of the load-receptacle, and vertical flanges 72 (see Fig. 4), which constitute lateral braces, and the guides are further secured to the body by bars 73. By the use of these guides, a movable pivotal connection is provided between the frame 22 and the load-receptacle 13. During the early part of the hoisting operation, the rollers 68 travel rearwardly with relation to the guide 69. Later, while the rollers continue to travel rearwardly, the guides travel forwardly. At the same time, the rollers 51 will travel forwardly along the guides 52 on the main frame. The two pairs of guides 52 and 69 are appropriately shaped in profile to produce the desired inclination of the load-receptacle at any given position during its elevation from its normal position shown in Fig. 1 to its maximum height shown in full lines in Fig. 3.

In Fig. 3, the load-receptacle is shown in dotted lines in what I term the bagging position,—that is to say, the position which is most convenient for discharging the coal or other material into bags, or other receptacles. It is desirable that when the load-receptacle is in the bagging position, it shall have substantially the same inclination which it has in its highest position, shown in full lines in Fig. 3, which is the position best adapted for the discharge of the coal or other material into a chute. In practice, this angle is approximately thirty-five degrees to the horizontal. The maintenance of this desirable angle in elevating the load-receptacle from the bagging position to the chute position is conveniently accomplished by making each guide 69 with a portion 74, which is disposed at an angle to a remaining portion 75 of the guide. In this example, the portion 74 is substantially parallel with the bottom of the load-receptacle,—that is to say, it is horizontal when the load-receptacle is in its normal position, shown in Fig. 1. Thus, it is evident that, starting from the position shown in Fig. 1, with the rollers 68 at the front ends of the guides 69, the rollers travel rearwardly and downwardly with relation to the receptacle, and the latter will travel upwardly and forwardly, during which time the latter will consequently be tilted upwardly at its front end, while it is being elevated. When, however, the rollers reach the portions 74 of the guides, they travel substantially parallel with the load-receptacle, as a consequence of which the latter is maintained at a substantially constant inclination during the remainder of the upward and forward movement of the receptacle. The forward movement of the receptacle is important, because it keeps the center of gravity of the receptacle forward of the axis of the rear wheels.

Reverting now to the guides 52 (see Fig. 6), each guide has a downwardly and forwardly inclined portion 76, a horizontal portion 77 and an upwardly and forwardly inclined portion 78. During the descent of the rollers 51 along the downwardly and forwardly inclined portions of the guides, the load-receptacle is lifted slowly, and with consequently great power. At first, the front of the load-receptacle ascends substantially parallel with the rear face of the driver's cab. This is indicated by the successive positions 1, 2, 3 and 4, of the front, lower corner shown in broken lines in Fig. 3. When the rollers 51 reach and travel forwardly along the horizontal portions 77, the front end of the load-receptacle rises rapidly, and the rear end rises, but not so rapidly as the front end. The front, lower corner, in rising, moves rearwardly from position 4 to position 5. The rear end of the frame 21 moves upwardly and forwardly, and, as it is connected by pivots to the frame 22, the latter is carried forwardly as it swings about the axis of the pivots 36. The lower corner of the load-receptacle then moves forwardly and upwardly, and finally overhangs the rear corner of the cab.

In the meantime, during the travel of the rollers 51 along the horizontal portions 77, the forward corner of the shoe 66 leaves the chain 53; and by the time the rollers reach the front ends of the horizontal portions, the rear corner of the shoe leaves the chain. During the early part of the travel of the rollers up the inclined portions 78, the inclination of the load-receptacle remains substantially constant, but the elevation of the load-receptacle continues. If it were not for the inclined portions 78, the inclination of the load-receptacle would increase too much, but its elevation bodily would increase insufficiently.

During the latter part of the travel of the rollers 51 up the inclined portions 78, the forward motion of the load-receptacle under the influence of the frame 21, and the rearward motion of the upper end of the frame 22 cause the rollers 68 to traverse the portions 74 of the guides 69. As a consequence, the inclination of the load-receptacle is now maintained, and the latter moves upwardly and rearwardly to the position shown in full lines in Fig. 3.

The described mechanism has many advantages, among them being simplicity, low cost and great lifting power. Another advantage is that the mechanism in its normal position occupies very little vertical space between the chassis frame and the load-receptacle, this space being only about sixteen inches as compared with a much greater space required for other mechanisms. It follows that the load-receptacle is mounted lower on the chassis, and the center of gravity is consequently lower, while the vehicle is moving about from place to place, and there is less side sway and less tendency to upset. Still another advantage is that, when the body is elevated, its center of gravity is forward of the axis of the rear wheels, as a consequence of which there is no tendency to tip the vehicle over backwardly. These are some of the advantages, but others will readily suggest themselves.

Having thus described one embodiment of the invention, but without limiting myself thereto, what I claim and desire by Letters Patent to secure is:

1. In a dumping land-vehicle of the elevating and tilting class, the combination of a load receptacle, a frame, a lever having its front end pivotally connected by a fixed pivot to said frame, and at its rear end connected by a fixed pivot to the rear end of said receptacle, a second lever pivoted to the first-mentioned lever and at its front end connected by a movable pivot to the front end of said receptacle, operating means connected to said second lever to move the latter forward, and a guide which supports and guides the rear end of said second lever in a downward direction.

2. In a dumping land vehicle of the elevating and tilting class, the combination of a load receptacle, a frame, a lever having its front end pivotally connected by a fixed pivot to said frame, and at its rear end pivoted to said receptacle, a second lever pivoted to the first-mentioned lever intermediate its ends and having its ends movable lengthwise of said receptacle and said frame, operating means for raising and lowering said levers, and means for causing the front end of said receptacle to move upwardly with relation to the front end of said second lever.

3. In a dumping land-vehicle of the elevating and tilting class, the combination of a frame, a member pivotally connected to said frame, a bearing block carried by and movable relatively to said member, a load-receptacle pivotally connected to said member, a second member, a pivot carried by said second member and pivoted to said bearing block, means to cause said second member to operate through the first-mentioned member to elevate said load-receptacle, and means at will to move said bearing block relatively to the first-mentioned member and from the path of said pivot.

4. In a dumping land-vehicle of the elevating and tilting class, the combination of a frame, a member pivotally connected to said frame, a two part bearing carried by said member, a load-receptacle pivotally connected to said member, a second member connected to said load-receptacle, a pivot carried by said second member and normally received in said bearing, means to cause said second member to operate through the first-mentioned member to tilt said load-receptacle and simultaneously to elevate said load-receptacle, and means at will to separate the two parts of said bearing to release said pivot from said bearing thereby to permit said second member to tilt said receptacle without elevating the same.

5. In a dumping land-vehicle of the elevating and tilting class, the combination of a frame, a member pivotally connected to said frame, a bearing carried by said member, a load-receptacle pivotally connected to said member, a second member connected to said load-receptacle, a pivot carried by said second member and normally received in said bearing, means to cause said second member to operate through the first-mentioned member to tilt said load-receptacle and simultaneously to elevate said load-receptacle, and means at will to remove a part of said bearing from above said pivot to permit said pivot to rise from the remaining part of said bearing thereby to permit said second member to tilt said receptacle without elevating the same.

6. In a dumping land-vehicle, the combination of a frame, a load-receptacle, a bodily movable lifting member connected at its front end to said load-receptacle, an actuator, a flexible operating member attached at one end to the rear end of said lifting member and at its other end to said actuator, said lifting member presenting an initial lift shoe deflecting said flexible member downwardly between its points of attachment, and a member pivoted to said lifting member, to said frame, and to said load-receptacle to cause the latter to be elevated bodily and said shoe to be lifted from said flexible member.

7. In a dumping land-vehicle, the combination of a frame, a load-receptacle, a bodily movable lifting member connected at its front end to said load-receptacle, a winding shaft, a flexible operating member attached at its rear end to said lifting member and at its front end to said winding shaft, said lifting member presenting an initial lift shoe deflecting said flexible member downwardly between its points of attachment, and a member pivoted to said lifting member, to said frame, and to said load-receptacle to cause the latter to be elevated bodily and said shoe to be lifted from said flexible member.

8. In a dumping land vehicle, the combination of a load-receptacle, a frame presenting a guide, two members pivoted to each other and pivotally connected to opposite ends, respectively, of said load-receptacle, one of said members being pivoted to said frame, and the other member being guided by said guide, an actuator, a flexible operating member attached at its front end to said actuator and at its rear end to one of said two members, and an initial lift shoe deflecting said flexible member downwardly between its points of attachment.

9. In a dumping land vehicle, the combination of a load-receptacle, a frame presenting a guide, two members pivoted to each other and pivotally connected to opposite ends, respectively, of said load-receptacle, one of said members being pivoted to said frame, and the other member being guided by said guide, a winding shaft, a flexible operating member attached at its front end to said shaft and at its rear end to said other member, and an initial lift shoe deflecting said flexible member downwardly between its points of attachment.

10. In a dumping land-vehicle, the combination of a load-receptacle, two members pivoted to each other and to said load-receptacle, a frame to which one of said members is pivotally connected at its front end, and mechanism for moving the rear end of the remaining member in a forward direction lengthwise of said frame, said mechanism including a winding shaft, and a flexible operating member attached at one end to said remaining member and at its other end to said shaft in a plane perpendicular to said shaft and coiling spirally upon itself in winding about said shaft.

11. In a dumping land-vehicle, the combination of a load-receptacle, a frame, two members pivoted to each other, and each pivotally connected to said load-receptacle and to said frame, one of said members having its rear end mounted to travel forwardly and rearwardly along said frame, and mechanism for actuating said members to elevate said load-receptacle, said mechanism including a winding shaft, and a flexible operating member attached at one end to said shaft in a plane perpendicular to said shaft and coiling spirally upon itself in winding about said shaft, said operating member being attached at its other end to said rear end which travels forwardly and rearwardly.

12. In a dumping land-vehicle, the combination of a load-receptacle having adjacent its front end a downwardly and rearwardly inclined guide, a frame, two members connected to each other by a pivot fixed relatively to both, one member being connected at its front end by a fixed pivot to said frame and connected at its rear end by a fixed pivot to said load-receptacle, the second member being connected at its front end by a travelling pivot to said guide and connected at its rear end to said frame by a pivot, and means connected to said second member to move the latter bodily in a forward and upward direction to cause said load-receptacle to be elevated and tilted during at least a part of its upward movement without substantial rearward movement.

13. In a dumping land-vehicle, the combination of a load-receptacle, a frame having an upwardly and forwardly inclined guide, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said guide by a travelling pivot, and means connected to said second member to move the latter bodily in a forward and upward direction to cause said load-receptacle to be elevated without substantial rearward movement during at least a portion of its upward movement.

14. In a dumping land-vehicle, the combination of a load-receptacle having adjacent its front end a downwardly and rearwardly inclined guide, a frame having an upwardly and forwardly inclined guide, two members connected to each other by a pivot fixed relatively to both, one member being connected at its front end by a fixed pivot to said frame and connected at its rear end by a fixed pivot to said load-receptacle, the second member being connected at its front end by a travelling pivot to the first-mentioned guide and being connected at its rear end by a travelling pivot to the second-mentioned guide, and means connected to said second member to move its rear end forwardly along the second-mentioned guide to cause said load-receptacle to be elevated without substantial rearward movement during at least a portion of its upward movement.

15. In a dumping land-vehicle, the combination of a load-receptacle having adjacent its front end a guide presenting a path which slopes downwardly and rearwardly and thence in another direction, a frame, two members connected to each other by a pivot fixed relatively to both, one member being connected at its front end by a fixed pivot to said frame and connected at its rear end by a fixed pivot to said load-receptacle, the second member being connected by a travelling pivot to said guide and connected at its rear end to said frame by a travelling pivot, and means connected to said second member to move the latter bodily in a forward and upward direction.

16. In a dumping land-vehicle, the combination of a load-receptacle, a frame having a guide presenting a path which extends forwardly and thence forwardly and upwardly, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said guide by a travelling pivot, and means connected to said second member to move the latter bodily in a forward and upward direction.

17. In a dumping land-vehicle, the combination of a load-receptacle, a frame having adjacent its rear end a guide presenting a path which extends forwardly and downwardly, thence in a generally horizontal direction and thence forwardly and upwardly, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said guide by a travelling pivot, and means connected to said second member to move the rear end forwardly along said guide to cause said load-receptacle to be elevated.

18. In a dumping land-vehicle, the combination of a load-receptacle, having adjacent its front end a guide which slopes downwardly and rearwardly and thence in another direction, a frame having adjacent its rear end a guide presenting a path which extends forwardly and downwardly, thence in a generally horizontal direction and thence forwardly and upwardly, two members connected to each other by a pivot fixed relatively to both, one member being connected at its front end by a fixed pivot to said frame and connected at its rear end by a fixed pivot to said load-receptacle, the second member being connected at its front end by a travelling pivot to the first-mentioned guide and being connected at its rear end by a travelling pivot to the second-mentioned guide, and means connected to said second member to move its rear end forwardly along the second-mentioned guide to cause said load-receptacle to be elevated.

19. In a dumping land vehicle, the combination of a load-receptacle, a frame, two members pivotally connected to each other, one member being connected at its front end by a fixed pivot to said frame and connected at its rear end by a fixed pivot to said load-receptacle, the second member being connected at its front end by a travelling pivot to said load-receptacle and connected at its rear end to said frame by a travelling pivot, and means connected to said second member to move the latter bodily in a forward and upward direction.

20. In a dumping land-vehicle, the combination of a load-receptacle, having adjacent its front end a downwardly and rearwardly inclined guide, a frame, two members pivotally connected to each other, one member being connected at its front end by a fixed pivot to said frame and connected at its rear end by a fixed pivot to said load-receptacle, the second member being connected at its front end by a travelling pivot to said guide and connected at its rear end to said frame by a travelling pivot, and means connected to said second member to move the latter bodily in a forward and upward direction.

21. In a dumping land-vehicle, the combination of a load-receptacle, a frame having an upwardly and forwardly inclined guide, two members pivotally connected to each other, one member being connected at its front end by a fixed pivot to said frame and connected at its rear end by a fixed pivot to said load-receptacle, the second member being connected at its front end by a travelling pivot to said load-receptacle and connected at its rear end to said guide by a travelling pivot, and means connected to said second member to move its rear end forwardly along said guide to cause said load-receptacle to be elevated without substantial rearward movement during at least a portion of its upward movement.

22. In a dumping land vehicle, the combination of a load-receptacle having adjacent its front end a downwardly and rearwardly inclined guide, a frame having adjacent its rear end an upwardly and forwardly inclined guide, two members pivotally connected to each other, one member being connected at its front end by a fixed pivot to said frame and connected at its rear end by a fixed pivot to said load-receptacle, the second member being connected at its front end by a travelling pivot to the first-mentioned guide and being connected at its rear end by a travelling pivot to the second-mentioned guide, and means connected to said second member to move its rear end forwardly along the second-mentioned guide to cause said load-receptacle to be elevated.

23. In a dumping land-vehicle, the combination of a load-receptacle having adjacent its front end a guide presenting a path which slopes downwardly and rearwardly and thence in another direction, a frame, two members pivotally connected to each other, one member being connected at its front end by a fixed pivot to said frame and connected at its rear end by a fixed pivot to said load-receptacle, the second member being connected by a travelling pivot to said guide and connected at its rear end to said frame by a travelling pivot, and means connected to said second member to move the latter bodily in a forward and upward direction.

24. In a dumping land-vehicle, the combination of a load-receptacle, a frame having adjacent its rear end a guide presenting a path which extends forwardly and thence forwardly and upwardly, two members pivotally connected to each other, one member being connected at its front end by a fixed pivot to said frame and connected at its rear end by a fixed pivot to said load-receptacle, the second member being connected at its front end by a travelling pivot to said load-receptacle, and connected at its rear end to said guide by a travelling pivot, and means connected to said second member to move its rear end forwardly along said guide to cause said load-receptacle to be elevated.

25. In a dumping land-vehicle, the combination of a load-receptacle, a frame having adjacent its rear end a guide presenting a path which extends forwardly and downwardly, thence in a generally horizontal direction and thence forwardly and upwardly, two members pivotally connected to each other, one member being connected at its front end by a fixed pivot to said frame and connected at its rear end by a fixed pivot to said load-receptacle, the second member being connected at its front end by a travelling pivot to said load-receptacle and connected at its rear end to said guide by a travelling pivot, and means connected to said second member to move its rear end forwardly along said guide to cause said load-receptacle to be elevated.

26. In a dumping land-vehicle, the combination of a load-receptacle, having adjacent its front end a guide which slopes downwardly and rearwardly and thence in another direction, a frame having adjacent its rear end a guide presenting a path which extends forwardly and downwardly, thence in a generally horizontal direction and thence forwardly and upwardly, two members pivotally connected to each other, one member being connected at its front end by a fixed pivot to said frame and connected at its rear end by a fixed pivot to said load-receptacle, the second member being connected at its front end by a travelling pivot to the first-mentioned guide and being connected at its rear end by a travelling pivot to the second-mentioned guide, and means connected to said second member to move its rear end forwardly along the second-mentioned guide to cause said load-receptacle to be elevated.

27. In a dumping land-vehicle of the elevating and tilting class, the combination of a load-receptacle, a frame, a lever having its front end pivotally connected by a fixed pivot to said frame, and at its rear end connected by a fixed pivot to the rear end of said receptacle, a second lever pivoted to the first-mentioned lever and at its front end connected by a movable pivot to the front end of said receptacle, operating means connected to said second lever to move the latter forward, and a guide which supports and guides the rear end of said second lever in a downward direction and then in another direction.

28. In a dumping land-vehicle of the elevating and tilting class, the combination of a load receptacle, a frame, a lever having its front end pivotally connected by a fixed pivot to said frame, and at its rear end connected by a fixed pivot to the rear end of said receptacle, a second lever pivoted to the first-mentioned lever and at its front end connected by a movable pivot to the front end of said receptacle, operating means connected to said second lever to move the latter forward, and a guide which supports and guides the rear end of said second lever in a downward direction and then in a generally horizontal direction.

29. In a dumping land-vehicle of the elevating and tilting class, the combination of a load receptacle, a frame, a lever having its front end pivotally connected by a fixed pivot to said frame, and at its rear end connected by a fixed pivot to the rear end of said receptacle, a second lever pivoted to the first-mentioned lever and at its front end connected by a movable pivot to the front end of said receptacle, operating means connected to said second lever to move the latter forward, and a guide which supports and guides the rear end of said second lever in a downward direction and subsequently in a forward and upward direction.

30. In a dumping land vehicle of the elevating and tilting class, the combination of a load receptacle, a frame, a lever having its front end pivotally connected by a fixed pivot to said frame, and at its rear end connected by a fixed pivot to the rear end of said receptacle, a second lever pivoted to the first-mentioned lever and at its front end connected by a movable pivot to the front end of said receptacle, operating means connected to said second lever to move the latter forward, and a guide which supports and guides the rear end of said second lever in a downward direction, then in a generally horizontal direction and finally in a forward and upward direction.

31. In a dumping land vehicle of the elevating and tilting class, the combination of a load receptacle, a frame, a lever having its front end pivotally connected by a fixed pivot to said frame, and at its rear end pivoted to said receptacle, a second lever pivoted to the first mentioned lever intermediate its ends and having its ends movable lengthwise of said receptacle and said frame, means at will to disconnect said second lever from the first mentioned lever, operating means for raising and lowering said levers, and a rearwardly and downwardly sloping guide carried by said receptacle and connected to the front end of said second lever to cause the front end of said receptacle to move upwardly with relation to the front end of said second lever.

32. In a dumping land vehicle of the elevating and tilting class, the combination of a load receptacle, a frame, a lever having its front end pivotally connected by a fixed pivot to said frame, and at its rear end pivoted to said receptacle, a second lever pivoted to the first-mentioned lever intermediate its ends and having its ends movable lengthwise of said receptacle and said frame, means at will to disconnect said second lever from the first mentioned lever, operating means for raising and lowering said levers, and a guide carried by said receptacle and connected to the front end of said second lever and having a portion which slopes downwardly and rearwardly and then extends in another direction.

33. In a dumping land vehicle, the combination of a load-receptacle, a frame, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said frame by a travelling pivot, means connected to the rear end of said second member to move its rear end forwardly along said frame to cause said load-receptacle to be elevated, means connecting the front end of said second member with said load-receptacle, and means comprising a sloping track connecting the rear end of said second member with said frame to cause said load-receptacle to be tilted as it is being elevated.

34. In a dumping land vehicle, the combination of a load-receptacle, a frame, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said frame by a travelling pivot, means connected to said second member to move its rear end forwardly along said frame to cause said load-receptacle to be elevated, and means comprising a downwardly sloping track to cause said second member to move bodily in a downward direction as its rear end is being moved forwardly.

35. In a dumping land vehicle, the combination of a load-receptacle, a frame, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said frame by a travelling pivot, means connected to said second member to move its rear end forwardly along said frame to cause said load-receptacle to be elevated, and means comprising an upwardly sloping track to cause said second member to move bodily in an upward direction as its rear end is being moved forwardly.

36. In a dumping land vehicle, the combination of a load-receptacle, a frame, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said frame by a travelling pivot, means connected to said second member to move its rear end forwardly along said frame to cause said load-receptacle to be elevated, and means comprising a downwardly and also upwardly sloping track to cause said second member to move bodily in a downward direction and subsequently bodily in an upward direction as its rear end is being moved forwardly.

37. In a dumping land vehicle, the combination of a load-receptacle, a frame, two members connected to each other by a pivot fixed relatively to both, one member being connected at its front end by a fixed pivot to said frame and connected at its rear end by a fixed pivot to said load-receptacle, the second member being connected at its front end by a travelling pivot to said load-receptacle and connected at its rear end to said frame by a travelling pivot, means connected to said second member to move its rear end forwardly along said frame to cause said load-receptacle to be elevated, and means comprising first a downwardly sloping portion, then a horizontal portion, and then an upwardly sloping portion to cause said second member to move bodily in a downward direction, then to be restrained against downward movement and finally to move bodily in an upward direction as the rear end is being moved forwardly.

38. In a dumping land-vehicle of the elevating and tilting class, the combination of a frame, a member pivotally connected to said frame, a load-receptacle pivotally connected to said member, a second member, a pivot carried by one of said members and normally connecting said members with each other, means to cause said second member to tilt said load-receptacle and simultaneously to operate through the first-mentioned member to elevate said load-receptacle while it is being tilted, and means at will to lock said pivot to and unlock the same from the other of said members.

39. In a dumping land vehicle of the elevating and tilting class, the combination of a load-receptacle, a frame, a member pivoted at its front end to said frame and at its rear end to said receptacle, a second member pivoted to the first, a connection between said second member and said load-receptacle, means including a part carried by said second member and a part on said frame for causing initial elevating of said receptacle and means distinct from the first-mentioned means and including a part on said frame for causing a continuation of the elevating of said receptacle subsequent to the initial lifting.

40. In a dumping land vehicle, the combination of a frame, a load-receptacle, a lifting member having its front end connected to the front end of said load-receptacle and movable bodily with relation thereto, an actuator, a flexible operating member attached at its rear end to said lifting member and at its front end to said actuator, a second lifting member, a pivot, means at will to cause said pivot to connect and disconnect said lifting members, and a guide which guides the rear end of the first-mentioned lifting member as it is carried forwardly by the pull of said flexible member, said second lifting member being pivoted to said frame and connected to said load-receptacle.

41. In a dumping land vehicle, the combination of a frame, a load-receptacle, two members crossing and pivoted to each other and pivotally connected, respectively, to opposite ends of said load-receptacle, one of said members being pivoted to said frame, an actuator, a flexible operating member attached at its front end to and wound on said actuator and attached at its rear end to one of the first-mentioned members, and an initial lift shoe rigidly carried by one of the first-mentioned members and deflecting said flexible member downwardly between its points of attachment.

42. In a dumping land vehicle, the combination of a load-receptacle and mechanism for elevating said load-receptacle bodily, said mechanism including two members pivotally connected to each other and to said load-receptacle, one of said members being bodily movable and having a downwardly directed projection, a shaft, and a flexible member attached at one end to said bodily movable member and attached at its other end to said shaft in a plane perpendicular to said shaft and coiling spirally upon itself in winding about said shaft, said flexible member normally engaging the under side of said projection.

43. In a dumping land-vehicle of the elevating and tilting class, the combination of a frame, a member pivotally connected to said frame, a load-receptacle pivotally connected to said member, a second member having pivotal connection with the first-mentioned member, said pivotal connection including a separable pivot and bearing, means to cause said second member to tilt said load-receptacle and simultaneously to operate through the first-mentioned member to elevate said load-receptacle while it is being tilted, and means independent of movement of said members to render said pivoted connection inoperative by separating said pivot and said bearing one from the other.

CLARK F. HIGGINS.